May 16, 1933.  C. MEYER  1,909,065
PROTECTIVE ARRANGEMENT FOR ELECTRIC INSTALLATIONS
Filed Aug. 28, 1930  2 Sheets-Sheet 1
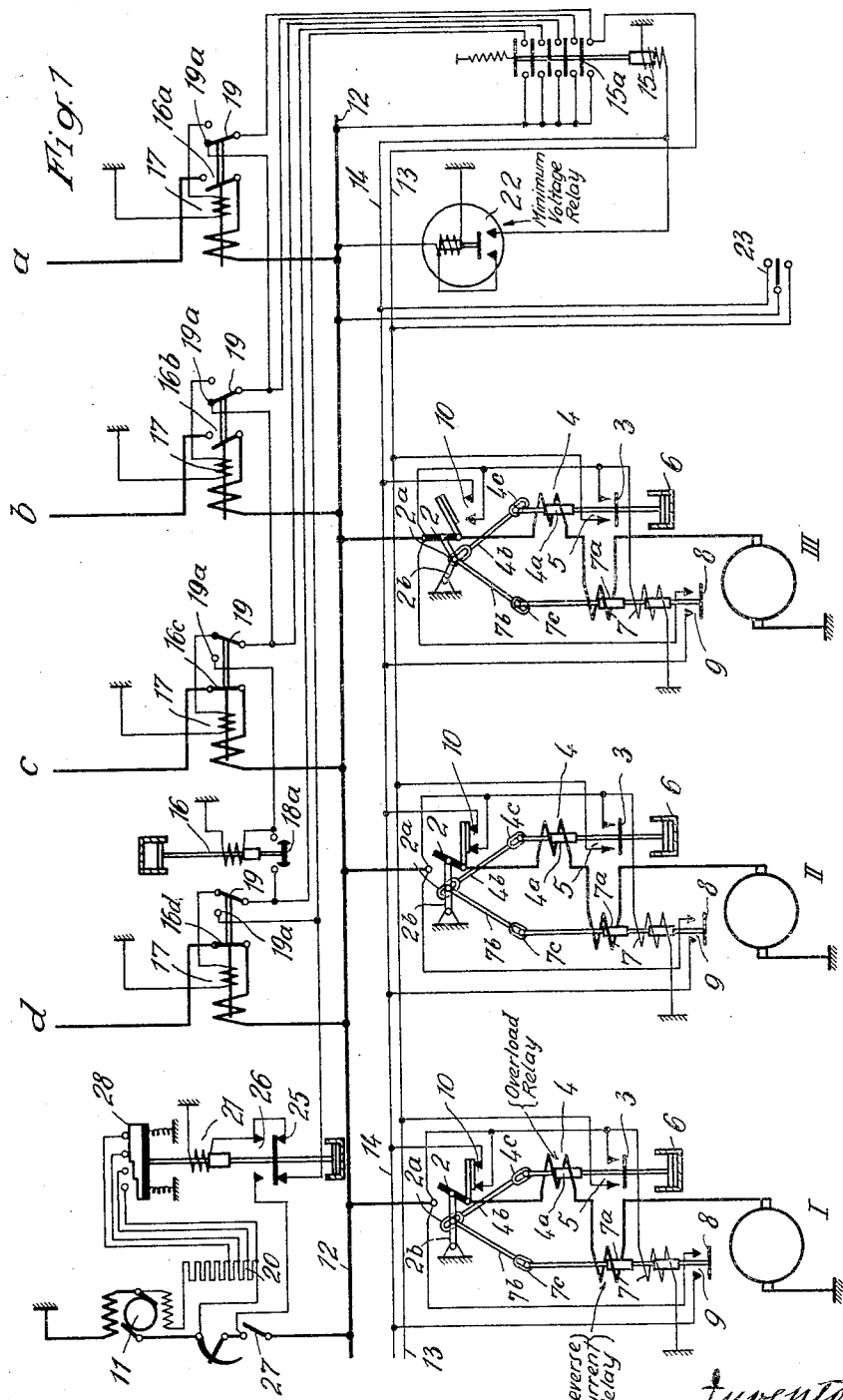

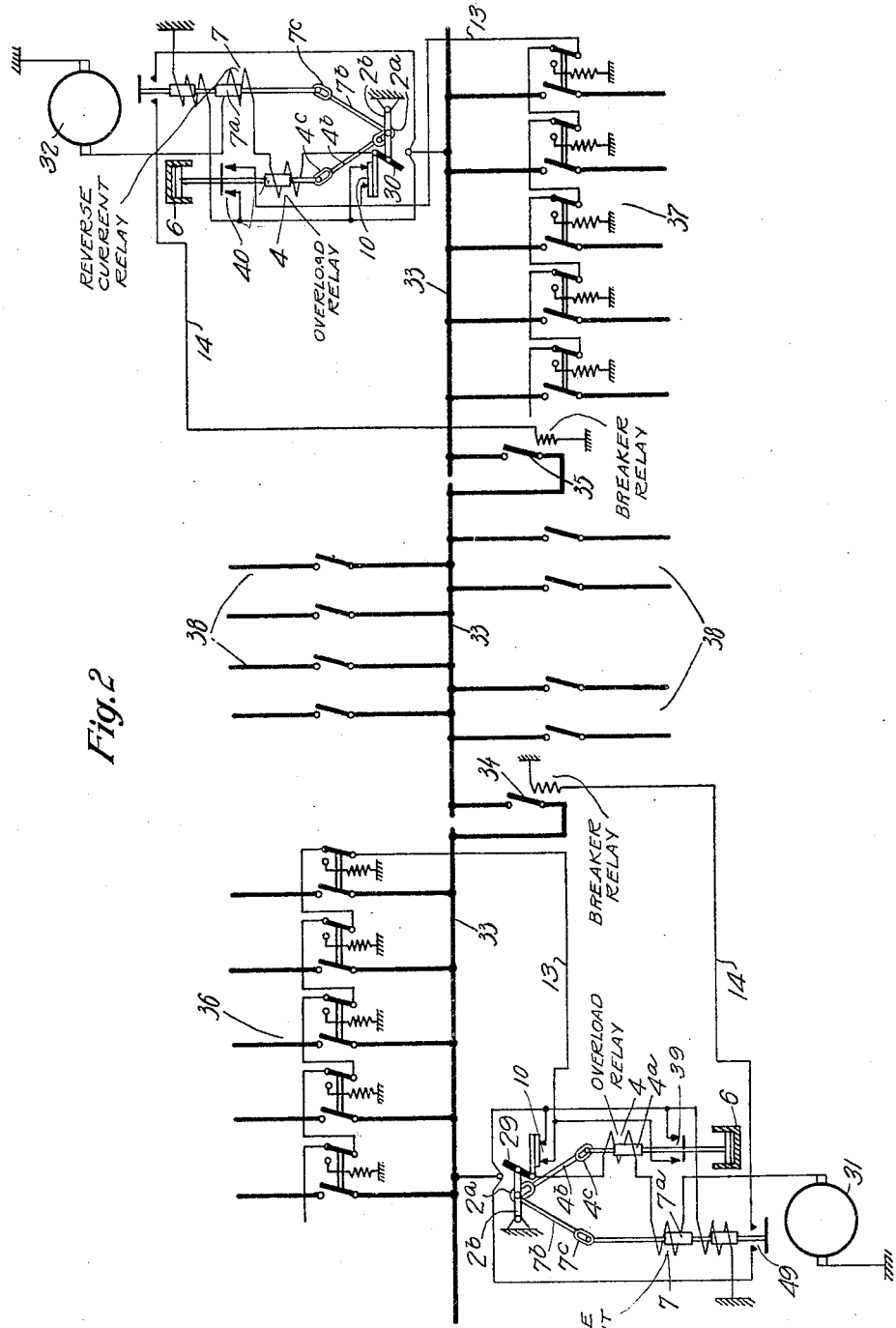

Patented May 16, 1933

1,909,065

UNITED STATES PATENT OFFICE

CARL MEYER, OF HAMBURG, GERMANY, ASSIGNOR TO SIEMENS-SCHUCKERTWERKE AKTIENGESELLSCHAFT, OF BERLIN-SIEMENSSTADT, GERMANY, A CORPORATION OF GERMANY

PROTECTIVE ARRANGEMENT FOR ELECTRIC INSTALLATIONS

Application filed August 28, 1930, Serial No. 478,528, and in Germany August 30, 1929.

My invention relates to improvements in protective arrangements for electric installations and specifically to arrangements for ensuring the reliability of the electricity supply of electric power installations.

For electric power installations and particularly for installations on ships where the generating plants are comparatively small and the loads on the plants comparatively high, arrangements are already known in the art by the means of which it is avoided to shut down the whole plant in consequence of the shutting down of, or overload on individual generators. With the known arrangements, the load is decreased by disconnecting from the mains, or at least by reducing the energy taken by, a number of consumers of lesser importance, in order by this means to ensure a sufficient supply of current for the essential parts of the installation. The cutting out of these less important consumers, chosen beforehand to be cut out under these circumstances, was performed simultaneously without consideration as to how heavy the load was on the machine and how much current was taken by the consumers, and as to which reduction of the load would suffice to remove the disturbance. The number of circuits cut out and the energy they represented, had therefore to be liberally chosen to ensure a sufficient reduction of the load on the plant, in case a fully loaded generator had to be shut down. The load actually thrown off to remove a small overload was in such a case too large. The invention has as its object to improve the known protective arrangements in such a manner that only enough load is taken off the plant to secure the maintenance of a reliable service.

This object is achieved according to the invention by causing the tripping devices, responding to an overload in a primary circuit and which actuates the automatic breakers of the distributing circuits, to operate successively, and by allowing only as many tripping devices to be set in operation as is in each case sufficient to reduce the load on the generators to a predetermined value.

The automatic breakers of the distribution circuits may be made to depend in such a manner upon one another that they can upon overload in a primary circuit only operate one after the other. According to the further invention, in addition to an auxiliary circuit, influencing at overload the successively responding tripping devices of the automatic switches of the distribution circuits, another auxiliary circuit may be provided by the means of which all of said tripping devices may be caused to operate simultaneously, if a reverse current flows or if the voltage drops. The tripping devices of the automatic breakers of the distribution circuits may also be provided with adjustable retarding devices which can be put out of action by the auxiliary circuit responding to overload, reverse current, or drop of voltage.

By means of the arrangement, other causes of disturbances can be removed. The cause of disturbance may, for instance, consist in two machines or stations working badly in parallel. In such a case, it is in the first place necessary to break the parallel connections. This may, as a further subject matter of this invention, be achieved by providing disconnecting switches responding to reverse current, by means of which switches the parallel connection is first of all severed when one of the generators is shut down, whereupon the tripping devices responding to overload cut out successively the distribution circuits apportioned to the particular machine or group of machines. By means of the latter arrangement, it is, therefore, possible to remove two different causes of disturbances, viz., reverse current and excess current, in two different ways; the reverse current is removed by severing the parallel connection of the machines and the overload by cutting out service lines.

The protective arrangement forming the subject matter of the invention is illustrated diagrammatically in the accompanying drawings in which the reduction to practice is shown in two examples.

In these drawings—

Fig. 1 shows a current supply system with three parallel connected generators and a number of automatically disconnectable consumers' lines, and Fig. 2 shows a system having two central stations connected in parallel to a common bus bar, the latter having connected to it several groups of important and unimportant consumers' lines.

Referring first to Fig. 1, this figure shows a single-pole diagram of an installation with three generators I, II, III connected in parallel, the first one of which I has been disconnected completely by opening the circuit-breaker 2 by hand, as may be seen from the position of the armature 3 of the main-current relay 4. The automatic breaker of machine II has just opened automatically; its maximum current coil 4 has, during the overload, attracted its core $4^a$, thereby opening breaker 2 in a manner to be described presently, and after the opening of the breaker the core $4^a$ has fallen back into the position shown. III is a machine in normal service; breaker 2 is closed and neither armature contacts 3 or 8 have closed their control circuits. Each of the generators I, II, III is connected to the bus bar 12 through its respective automatic circuit-breaker 2. Each automatic circuit-breaker is designed to respond to overload current and reverse current. The movement of the armature 3 of each overload current relay 4 is retarded by the adjustable time-delay device 6, so that the coil 4 carrying the overload current can attract its armature but slowly; as is customary in such relays, the opening takes place quickly only in the case of a heavy overload current, several times that of normal, and heavy enough to quickly overload the resistance of the retarding device. For actuating breaker lever 2, the latter may for instance be connected to a toggle lever joint $2^b$, the center joint of which latter is connected by a rod $4^b$ and lost motion joints $2^a$ and $4^c$ to solenoid core $4^a$, and by a rod $7^b$ and lost motion joint $7^c$ to the solenoid core $7^a$ of reverse current relay 7. If with such an arrangement as for instance shown at machine III, either coil 4 or 7 is energized, its solenoid core, when attracted, will after traversing a certain distance, push the center of joint $2^b$ upward and thereby open breaker 2, as shown with machine II. The overload current relay 4, in case an overload develops, thus does not immediately operate its circuit breaker 2 and disconnect its generator from the line. Its response to a gradually developing overload is gradual, and is controlled by the retarding device 6. The core-controlled contact device 3 is accordingly so designed that it closes to contacts already at the occurrence of a slight overload which is not sufficient to move core $4^a$ far enough to bring about the operation of breaker 2. The purpose of this arrangement will appear from the later description of the load cut-out devices.

The solenoid core $7^a$ of trip core 7 of the reverse current relay is not connected to a retarding device, such as 6, so that when this relay responds at all, its core and contact armature respond immediately and completely by causing the closing of contacts 9 and circuit breaker 2 to open immediately in case of even a small reverse current, which necessitates an immediate disconnection of the machine. For the switching in of the protective arrangement by the reverse current relay, and which is described further below, auxiliary contacts 9 are provided with and controlled by armature 8 of that relay. A third pair of auxiliary contacts is provided for each breaker, namely the two auxiliary contacts 10 which are controlled by the automatic circuit breaker 2 itself.

One contact of each pair 5 in each of the main breakers for generators I–III, is connected to a common line 13, while the other contact is connected to the main feeder 12 at its pertaining breaker, so that when the contacts 5 of a breaker are closed, control current can be sent from main 12 into line 13 from that point for the purpose to be explained later. Similarly one of the control contacts 9 of each reverse current breaker 7, 8 leads to a common line 14, while the other contact is connected to the main feeder 12 at the pertaining breaker, so that when those contacts are closed, control current can be sent from main 12 into line 14, for the purpose also to be described later. The contacts 10 of each breaker are arranged in parallel to the pertaining contact pair 9. They are closed when the pertaining breaker switch is open, and are open when the switch is closed. The consumers' lines a, b, c, d which may be of lesser importance to maintain closed in case of emergency, are connected to main 12 by means of the automatic breaker switches $16^a$, $16^b$, $16^c$, $16^d$. Each of these switches can be actuated by an auxiliary coil 17, controlled by a switch 19. All of these switches 19 are connected in cascade and to line 13 in the following manner. Switch 19 of line a is connected directly with line 13, so that when current flows through the latter in the manner described, this current also flows through coil 17 of switch $16^a$, when the latter is in normal position, i. e., closed. This closed position is illustrated with respect to switch $16^c$. Thereby, coil 17 is energized and opens breaker $16^a$ and at the same time throws switch 19 into the position $19^a$ where it connects line 13 directly to switch 19 of breaker $16^b$, causing the latter to open similarly and thereby establishing a direct connection of switch 19 of breaker $16^c$ with line 13. Thus the breakers for lines a–d are successively opened as soon and so long as current flows through line 13 as described. In Fig. 1 the breakers $16^a$, $16^b$, are already open and $16^c$ is about to be opened.

The manner in which the breakers are operated when the control current is supplied through line 14 as described before, is essentially different. Control current flows through control line 14 as soon as the reverse current relay 7 is energized in any of the breakers for generators I-III. All disconnectable consumers should therefore be cut off at once. For this purpose the control switches 19 of these consumers are also connected by individual lines to a multiple contact switch 15$^a$ operated by a relay 15. This relay is connected directly to line 14. Therefore, as soon as this line receives current through the operation of any of the reverse current relays 7, the relay is energized, closes switch 15$^a$ and the latter supplies current from main 12 to all switches 19 in parallel so that all consumers' line breakers $a$–$d$ are actuated simultaneously.

A power transmission system as aforedescribed operates as follows:

Let us assume that the breaker switches of all generators are closed so that all generators furnish power into the consumers' line. If now a heavy overload should arise in the system which puts an impermissibly heavy overload on one or the other generator, or if a reverse current should tend to flow in such a generator, its overload relay 4 or its reverse current relay 7, as the case may be, will quickly and forcefully respond, opening the pertaining breaker switch 2, thereby cutting the generator off the line and actuating multiple contact switch 15$^a$, which cuts out simultaneously all unessential consumers in the manner described. Such may be the case for instance with generator I or II in Fig. 1, as shown. A generator thus disconnected from the line may only be re-connected by hand, after the operator has investigated and removed the cause of the disturbance. This automatically also reconnects the disconnected consumers, as soon as relay 15 is de-energized by opening contacts 10 at the pertaining breaker switch 2.

Let us again assume that all generators are connected and supply power to the mains, and that all unessential consumers are supplied with current, and let us now assume that only a slight overload develops upon one of the generators, for instance generator III, not enough to trip its breaker switch 2. In that case its relay 4 merely slightly raises its armature 4$^a$, slowly under the influence of dash pot 6, and merely closes contacts 5. thereby energizing control circuit 13. Now the cascaded circuit breaker 17 of the individual unessential consumers commence to operate one by one in the manner described. As these consumers are thus gradually removed (as shown for instance 16$^a$, 16$^b$), the load on the generating station or stations decreases. When the load is sufficiently reduced, the contact armature 3 of the overload relay 4 which had responded to the overload (without thereby opening its breaker 2, as described before), returns into its open contact position, and by reopening the auxiliary contacts 5, cuts off current from line 13, whereby the entire protective arrangement is set at rest. For instance, if the control current in line 13 is cut before coil 17 of breaker 16$^c$ is energized, the latter remains closed, and thus only 16$^a$ and 16$^b$ have opened. In the above manner it is possible, upon overload to cut out only as many consumers as are necessary to remove the overload.

By providing time-delay devices in actuating the automatic breakers 16, the speed at which the cutting out of the breakers takes place may also be regulated. For instance the breaker 16$^d$ is provided with such a retardation device. Here the connection of its switch 19 with the corresponding switch 19 of the preceding breaker 16$^c$ is not established directly, but by way of the retarded relay 18 which is energized when breaker 16$^c$ opens. This relay through the action of a conventional retarding device closes switch 18$^a$ only after a certain lapse of time and only then current from line 13 is delivered to switch 19 of breaker 16$^d$, causing the latter to open and to set the circuit for opening the next breaker for the last consumer shown at the left of Fig. 1.

This last consumer is assumed to be a motor 11. This motor may, for instance, be assumed to be essential for the operation of the entire plant, and thus should not be cut off altogether, but it may be permissible to temporarily reduce its output by causing steps of the shunt regulator 20 to be short-circuited by means of a controller 28 operated by the automatic breaker 21, provided with a retarding device and operated from the control line 13 through the circuit set by the preceding breaker as described. In this case breaker coil 21 is first energized from line 13 by way of switch 25 normally closed. When the coil armature gradually responds, it opens switch 25 but also closes switch 26, so that the coil still remains energized, but now not by way of line 13, but directly from feeder 12, so long as switch 27 is closed. This brings the breaker coil under the control of switch 27.

The arrangement of cutting out the consumers' lines, one after the other, has for the dimensioning of the auxiliary contacts and auxiliary lines the further advantage that the currrent required for operating the protective arrangement is smaller than with the hitherto known arrangements, since the trip coils 17 are in the present case energized one after the other, and not simultaneously as was formerly the case. Of course, through the control line 14 operating the relay 15 all the automatic cut out 16 are caused to open simultaneously, but this is an exceptional emergency. When a machine has shut down completely owing to its reverse-current release having operated, it is of special importance that the load on the power station should be reduced as quickly and as efficiently as possible, whereas when the machines are overloaded a gradual reduction of the load to its normal value is more preferable.

It had been mentioned incidental to the description of contacts 9 and 10, that they are both connected in parallel to auxiliary line 14. This provision is necessary for the following reason. As soon as the reverse current relay 7 responds, it closes contacts 9 resulting in the cutting off of all unessential consumers as described. At the same time circuit breaker 2 is tripped and disconnects the pertaining generator from the main. This immediately de-energizes the reverse current relay and thereby opens contacts 9, and would thereby interrupt the flow of auxiliary current in the line 14 still necessary to keep the undesired consumers off the main. By using breaker 2 for closing the parallel connected contacts 10 when the breaker is in open position, continuity of auxiliary current supply to line 14 is ensured, until the entire system can be restored to normal condition. Contacts 10 are also useful for the emergency in case of an extremely heavy overload at which the overload relay trips the circuit-breaker 2. As in this case the latter likewise closes contacts 10, line 14 is immediately energized and all unessential consumers are simultaneously disconnected in the manner described.

The switching-in of the protective arrangement is generally performed by the response of the auxiliary contacts fixed to the armatures of the automatic circuit-breaker coils or to the automatic circuit-breaker itself; the actuation of these devices therefore depends upon the value of current. However, there is the possibility that the automatic circuit-breakers do not respond, owing to the fact that in generators voltage drops are likely to occur. To provide for this emergency a minimum voltage relay 22 is connected to the bus bar 12 and serves to quickly cut in the protective arrangement when the voltage drops to a certain minimum value. In the arrangement illustrated in Fig. 1, the voltage relay 22, the same as line 14, controls directly the relay 15. If the currents required by the protective arrangement are too heavy for the contacts of the voltage relay, an intermediate relay may naturally be employed.

After the protective arrangement has thus operated and has taken the load off the power station, the driven machines resume their normal speed and voltage, and the protective arrangement is switched off again. The attendant then puts an additional machine into operation and the consumers' circuits which were cut out may according to the available capacity of the station without further trouble be switched in again. In order to be able, for any special reasons, to make the protective arrangement operative at will, a two-way switch 23 is provided, by means of which it is possible for the operator to energize control line 13 or 14, as may be desired.

The control wire lines may also be used for controlling separate groups of automatic circuit breakers or groups of consumers. It can thereby be achieved that in case of a disturbance occurring in one of several main machines, first of all, the parallel connections between the machines are opened by the action of the reverse-current relay, and that if the individual machines are thereby overloaded, their overload-current devices cut out thereafter the disconnectable consumer circuits apportioned to these machines. An arrangement of this kind is particularly suitable for installations in which there are two or more generating stations which, as is usually the case on men of war, are installed far apart at different places. If one of the generating stations is damaged and shut down, the parallel connections are first disconnected by means of the reverse-current relays, i. e., the connecting wire line between the two power stations is interrupted. The power station remaining in operation must then take over the generation of the whole current and is possibly overloaded under these circumstances. By means of the protective arrangement responding now to overload-current according to the invention, the less important consumers are cut out one after another, so that the overload on the generator or generators is relieved.

Fig. 2 illustrates an installation of the above described kind.

The example assumes two power stations, each of which may consist of one or more generators 31, 32; the drawing shows one generator at each station. The two generating stations are connected in parallel with one another to the main bus bars 33. The bus bar 33 may be divided into three sections by means of disconnecting automatic switches 34 and 35. The middle section feeds the important consumers 38, whose current supply should not be cut off. The other two sections feed unimportant consumers 36, 37 which can be safely cut off in case of overload. The arrangement is made in such a manner that if the station 31 receives a reverse current, its reverse current relay responds and opens breaker 29, thereby removing the generator from the line. At the same time it closes auxiliary switch 49 (the same as 9 in Fig. 1) which sends control current over line 14 to the relay of breaker 34 which causes the latter to open and to disconnect the left-hand section of bus bar 33 which feeds the unimportant consumers 36. Now station 32 has to take over the whole of the remaining load. Generator 31 similarly takes the remaining load in case generator 32 is cut off. Should the remaining station be overloaded thereby, its overload relay responds and the auxiliary contacts 39, or 40, as the case may be, are closed and send by means of line 13, as in Fig. 1, current to the consumers' line breakers. In Fig. 2 the necessary number of unimportant consumers 36 or 37 are thus disconnected one by one in the manner shown in Fig. 1, to reduce the load to its normal working value.

In the aforedescribed arrangements, the mode of operation by which the tripping devices respond one after another, is obtained by bringing the breakers into a dependency upon one another in such a manner that only after the removal of one consumer circuit the tripping device of the automatic breaker of the next consumer circuit can respond. The same action can also be obtained in a somewhat different manner. In connection with the tripping devices of the consumers' line breakers, time-delay devices may, for instance, be employed, which are put into and out of action by an auxiliary circuit responding to overload, reverse current or drop of voltage. If these time-delay devices are set for different lengths of time, they will, it is true, all be put into operation simultaneously through the auxiliary circuit, but the tripping devices of the automatic breakers will only respond one after another and only as many of them as is necessary under the circumstances.

I claim as my invention:

1. In an arrangement for ensuring current supply in electric power installations, comprising a main bus bar, a plurality of generators connected in parallel to said bus bar, a plurality of consumers' lines connected to the bus bar and individual automatic cut-out devices for at least some of said consumers' lines, to cut out said lines in case one of said generators is overloaded, an overload current relay in the circuit of each generator, a tripping device for each of said relays and actuated by it to cut its generator off the bus bar at a desirable maximum current overload value upon the respective generator, a tripping device for each of said consumers' line cut-out devices, means for each overload relay, and operable by it also at overloads less than maximum, for supplying auxiliary current to at least some of said consumers' cut-out tripping devices, said last-named devices being arranged in cascade connection, with respect to said auxiliary current supply, whereby a tripping device, in responding to said current, switches said current supply to the next succeeding tripping device, and whereby consumers' tripping devices are energized and consumers are cut out successively only so long as an overload relay responds to its individual generator overload.

2. In an arrangement for ensuring current supply in electric power installations, comprising a main bus bar, a plurality of generators connected in parallel to said bus bar, a plurality of consumers' lines connected to the bus bar and individual automatic cut-out devices for at least some of said consumers' lines, to cut out said lines in case one of said generators is overloaded, an overload current relay in the circuit of each generator, a generator tripping device for each of said relays and actuated by it to cut its generator off the bus bar at a desirable maximum current overload value upon the respective generator, a tripping device for each of said consumer's line cut-out devices, means for each overload relay, and operable by it also at overloads less than maximum, for supplying auxiliary current to at least some of said consumers' tripping devices, said last-named devices being arranged in cascade connection, with respect to said auxiliary current supply, whereby a consumer's tripping device, in responding to said current, switches said current supply to the next succeeding tripping device, and whereby consumers' tripping devices are energized and consumers are cut out successively only so long as an overload relay responds to its individual generator overload, additional individual circuit connections for said consumers' tripping devices, and a common switch therefor, and means for supplying auxiliary current to said switch for simultaneously energizing all of said consumers' tripping devices when said switch is closed, a relay for actuating said common switch, a reverse current relay in the circuit of each generator and connected to the generator tripping device to disconnect the pertaining generator from the bus bar, said reverse current relay having auxiliary contacts, closed when the relay is energized and located in the auxiliary current supply to said common switch relay, for energizing said switch relay and actuating said switch, to simultaneously disconnect all of said consumers' lines on occurrence of a reverse current flow to the generator.

3. In an arrangement for ensuring current supply in electric power installations, comprising a main bus bar, a plurality of generators connected in parallel to said bus bar, a plurality of consumers' lines connected to the bus bar and individual automatic cut-out devices for at least some of said consumers' lines, to cut out said lines in case one of said generators is overloaded, an overload current relay in the circuit of each generator, a generator tripping device for each of said relays and actuated by it to cut its generator off the bus bar at a desirable maximum current overload value upon the respective generator, a tripping device for each of said consumers' line cut-out devices, means for each overload relay, and operable by it also at overloads less than maximum, for supplying auxiliary current to at least some of said consumers' tripping devices, said last-named devices being arranged in cascade connection with respect to said auxiliary current supply, whereby a tripping device, in responding to said current, switches said current supply to the next succeeding tripping device, and whereby consumers' tripping devices are energized and consumers are cut out successively only so long as an overload relay responds to its individual generators overload, and additional individual circuit connections for said consumers' tripping devices, and a common switch therefor, and means for supplying auxiliary current to said switch for simultaneously energizing all of said consumers' tripping devices when said switch is closed, a relay for actuating said common switch, and a minimum voltage relay responsive below a desired minimum voltage at said bus bar for supplying auxiliary energizing current to said common switch relay for actuating said switch.

4. In an arrangement for ensuring current supply in electric power installations, comprising a main bus bar, a plurality of generators connected in parallel to said bus bar, a plurality of consumers' lines connected to the bus bar and individual automatic cut-out devices for at least some of said consumers' lines, to cut out said lines in case one of said generators is overloaded, an overload current relay in the circuit of each generator, a generator tripping device for each of said relays and actuated by it to cut its generator off the bus bar at a desirable maximum of current overload value upon the respective generator, a tripping device for each of said consumers' line cut-out devices, means for each overload relay, and operable by it also at overloads less than maximum, for supplying auxiliary current to at least some of said consumers' tripping devices, said last-named devices being arranged in cascade connection with respect to said auxiliary current supply, whereby a tripping device, in responding to said current, switches said current supply to the next succeeding tripping device, and whereby consumers' tripping devices are energized and consumers are cut out successively only so long as an overload tripping device responds to its individual generator overload, additional individual circuit connections for said consumers' tripping devices, and a common switch therefor, and means for supplying auxiliary current to said switch for simultaneously energizing all of said tripping devices when said switch is closed, a relay for actuating said common switch, a reverse current relay in the circuit of each generator, and connected to the generator tripping device to disconnect the pertaining generator from the bus bar, said reverse current relay having auxiliary contacts, closed when the relay is energized and located in the auxiliary current supply to said common switch relay, for energizing said switch relay and actuating said switch, to simultaneously disconnect all of said consumers' lines on occurrence of a reverse current flow to the generator, and a minimum voltage relay responsive below a desired minimum voltage at said bus bar for supplying auxiliary energizing current to said switch relay independently of any current supplied to it through said reverse current relay contacts, for actuating said common switch.

5. In an arrangement for ensuring current supply in electric power installations, a main bus bar, at least two groups of consumers' lines having automatic cut-out devices and being connected to said bar, and one group of consumers' lines permanently connected to said bar and arranged between said two other groups, and automatic bus bar section switches between said three consumer groups, at least two generators, each connected to one of the bus bar sections feeding an automatically disconnectable consumer group, an overload current relay between each generator and its bus bar section, means controlled by said overload relay on its overload response for successively actuating sufficient line cut-out devices of the pertaining consumers' group to restore normal load to the generator, and a reverse current relay for each generator for disconnecting the generator from its bus bar section on occurrence of reverse current, and an auxiliary current supply circuit, closed by the response of said reverse current relay, for energizing the automatic bar section switch for disconnecting the pertaining bus bar section from the other bar sections.

In testimony whereof I affix my signature.

CARL MEYER.